United States Patent Office.

HERMANN BOEDEKER AND CARL HOFFMANN, OF HÖCHST-ON-THE-MAIN, GERMANY, ASSIGNORS TO THE FARBWERKE, VORMALS MEISTER, LUCIUS & BRÜNING, OF SAME PLACE.

ALKYLATED RHODAMIN SULFONIC ACID.

SPECIFICATION forming part of Letters Patent No. 642,893, dated February 6, 1900.

Application filed December 29, 1897. Serial No. 664,435. (Specimens.)

*To all whom it may concern:*

Be it known that we, HERMANN BOEDEKER, doctor of philosophy, a subject of the Emperor of Germany, and CARL HOFFMANN, doctor of philosophy, a subject of the Emperor of Austria-Hungary, both residing at Höchst-on-the-Main, Germany, have invented new and useful Improvements in the Manufacture of Sulfonic Acids of Alkyl Derivatives of Meta-Amidophenolphthalein, (for which we have obtained Letters Patent in Germany, No. 87,977, dated July 9, 1895; in France, No. 253,812, dated February 8, 1896, and in England, No. 2,999, dated February 10, 1896,) of which the following is a specification.

This invention relates to the production of sulfonic acids of alkyl derivatives of the meta-amidophenolphthalein.

Hitherto the application of certain alkylated meta-amidophenolphthaleins, as well as of meta-amidophenolphthalein itself, was difficult on account of their slight solubility—that is to say, their salts are stable only in a strong acid solution, while in a weak acid, such as is employed for dyeing purposes, they separate the free base which is almost insoluble in water. The above-mentioned disadvantages may be avoided by treating these meta-amidophenolphthaleins with fuming sulfuric acid at a low temperature, so that they are transformed into sulfonic acids, easily soluble in alkalies, and very suitable for dyeing purposes. The tetra-alkylated rhodamins, however, do not yield sulfonic acids according to this process and are inapplicable for this purpose. The shade hardly differs from that of the raw material. According to the quantity and strength of the fuming sulfuric acid employed, as well as the time of reaction, simple or higher sulfonated products are obtained.

Example: Five kilos of free symmetric diethyl-meta-amidophenolphthalein or its hydrochlorid are slowly introduced with constant stirring into thirty kilos of fuming sulfuric acid containing ten per cent. sulfuric anhydride at a temperature not exceeding 20° centigrade. Stirring is continued until all is thoroughly dissolved and until a test portion poured into water and treated with excess of alkali no longer separates the free diethylrhodamin base. The sulfonic acid thus obtained is precipitated by pouring it into water. The precipitation is completed by the addition of salt. The acid is filtered, dissolved in soda, and by evaporation or precipitation with salt the coloring-matter is obtained in a suitable form.

The diethylrhodamin sulfonic acid is with difficulty soluble in water, more easily in alcohol, with a yellowish-red color and a greenish-yellow fluorescence. It is insoluble in benzene, chloroform, ether, and acetic ether. It separates from the hot aqueous solution in form of small red crystals of metallic luster and on addition of salt in bright cinnabar-red flakes.

The coloring-matter is completely absorbed by wool in an acid-bath and dyes with the tint of symmetrical di and tri ethylrhodamin with brilliant fluorescence. The corresponding sulfonic acid of triethylrhodamin is obtained in a similar manner by treating the triethyl-meta-amidophenolphthalein (triethylrhodamin) with fuming sulfuric acid.

Having now described our invention, what we claim is—

As new products, the sulfonic acids of the specified alkylated meta-amidophenolphthaleins obtained as herein described, the same being soluble with difficulty in water, more easily soluble in alcohol with a reddish color and strong fluorescence, insoluble in benzene, chloroform, ether and acetic ether, the coloring-matter being completely absorbed by wool in an acid-bath and dyeing with the tint of alkylated meta-amidophenolphthaleins with a vivid fluorescence, substantially as described.

In testimony that we claim the foregoing as our invention we have signed our names in presence of two subscribing witnesses.

H. BOEDEKER.
CARL HOFFMANN.

Witnesses:
HEINRICH HAHN,
ALFRED BRISBEIS.